United States Patent [19]
Masaki et al.

[11] Patent Number: 5,757,452
[45] Date of Patent: May 26, 1998

[54] COLOR LIQUID CRYSTAL PANEL WITH LIGHT SHIELDING LAYER SECTIONS FORMED BETWEEN COLOR FILTER FILMS WITHOUT CONTACTING SAID COLOR FILTER FILMS

[75] Inventors: Yuichi Masaki, Kawasaki; Kazuya Ishiwata, Yokosuka; Masaaki Suzuki; Yuko Yokoyama, both of Yokohama, all of Japan

[73] Assignee: Canon Kabushiki Kaisha, Tokyo, Japan

[21] Appl. No.: 575,543

[22] Filed: Dec. 20, 1995

[30] Foreign Application Priority Data

Dec. 27, 1994 [JP] Japan ............... 6-325094
Dec. 19, 1995 [JP] Japan ............... 7-330360

[51] Int. Cl.$^6$ ............... G02F 1/1343; G02F 1/1335
[52] U.S. Cl. ............... 349/110; 349/106; 349/108
[58] Field of Search ............... 349/110, 106, 349/108

[56] References Cited

U.S. PATENT DOCUMENTS

| | | | |
|---|---|---|---|
| 4,569,574 | 2/1986 | Masaki et al. | 350/334 |
| 4,591,240 | 5/1986 | Masaki et al. | 350/339 R |
| 5,282,070 | 1/1994 | Nishida et al. | 359/67 |
| 5,323,252 | 6/1994 | Yoshida et al. | 359/54 |
| 5,365,357 | 11/1994 | Ohgawara et al. | 349/106 |
| 5,412,494 | 5/1995 | Ishiwata et al. | 359/67 |
| 5,568,292 | 10/1996 | Kim | 349/110 |
| 5,617,230 | 4/1997 | Ohgawara et al. | 349/110 |

FOREIGN PATENT DOCUMENTS

| | | | |
|---|---|---|---|
| 0385419 | 9/1990 | European Pat. Off. | |
| 0387805 | 9/1990 | European Pat. Off. | |
| 359172627A | 9/1984 | Japan | 349/110 |
| 362150221 A | 7/1987 | Japan | 349/110 |
| 2-1311 | 1/1990 | Japan | |
| 2144525 | 6/1990 | Japan | |

OTHER PUBLICATIONS

Patent Abstracts of Japan, vol. 94, No. 12 (Dec. 2, 1994).

*Primary Examiner*—William L. Sikes
*Assistant Examiner*—Julie Ngo
*Attorney, Agent, or Firm*—Fitzpatrick, Cella, Harper & Scinto

[57] ABSTRACT

The invention provides a color liquid crystal panel which has a liquid crystal placed between a first substrate and a second substrate, the first substrate having formed thereon a plurality of color filter films and transparent electrodes and the second substrate having formed thereto a transparent electrode. It also has first light-shielding layer sections, formed on the first substrate either in the same layer as the color filter film or in a layer at the substrate side from the color filter films, without contacting the color filter films. It further has second light-shielding layer sections formed in a layer at the liquid crystal layer side from the color filter films. Light is completely shielded by the first light-shielding layer sections and/or the second light-shielding layer section(s) between the color filter films. Such a color liquid crystal panel is highly effective in shielding the gaps between the color filter films, and is less reflective to external light or the like at the display surface.

12 Claims, 9 Drawing Sheets

FIG. I (A)
PRIOR ART
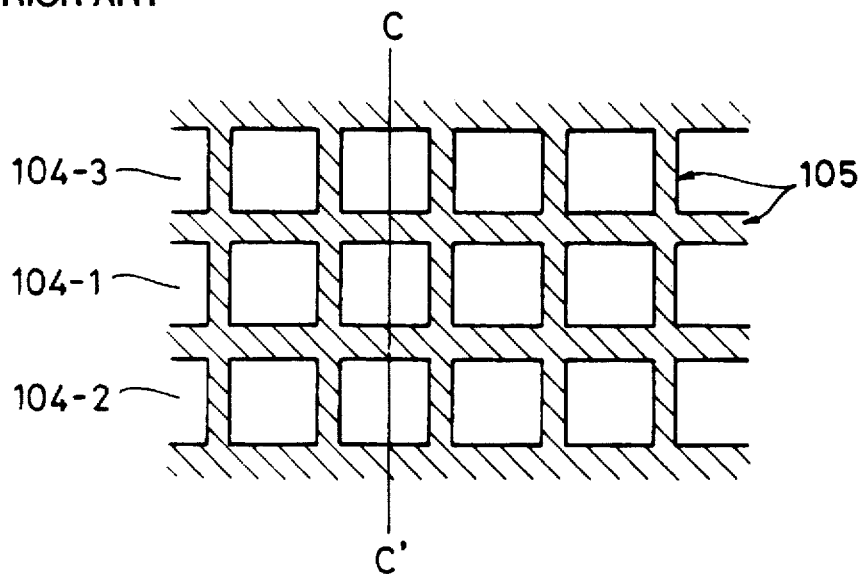
FIG. I (B)
PRIOR ART
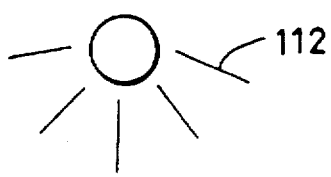
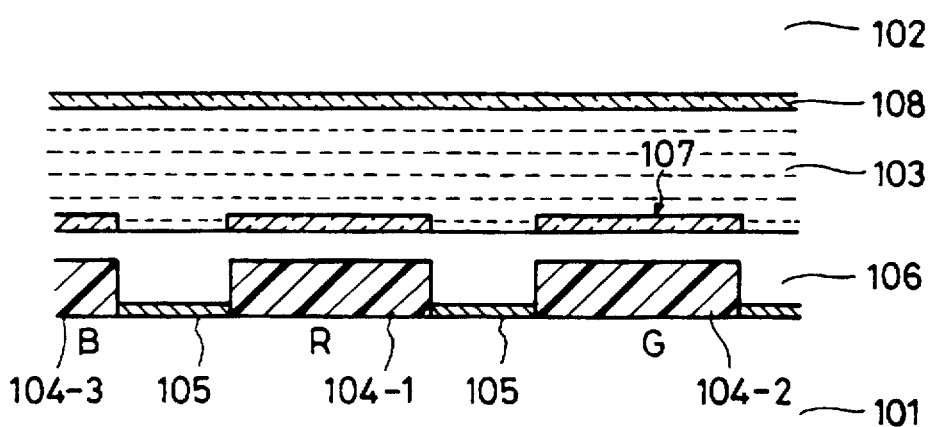

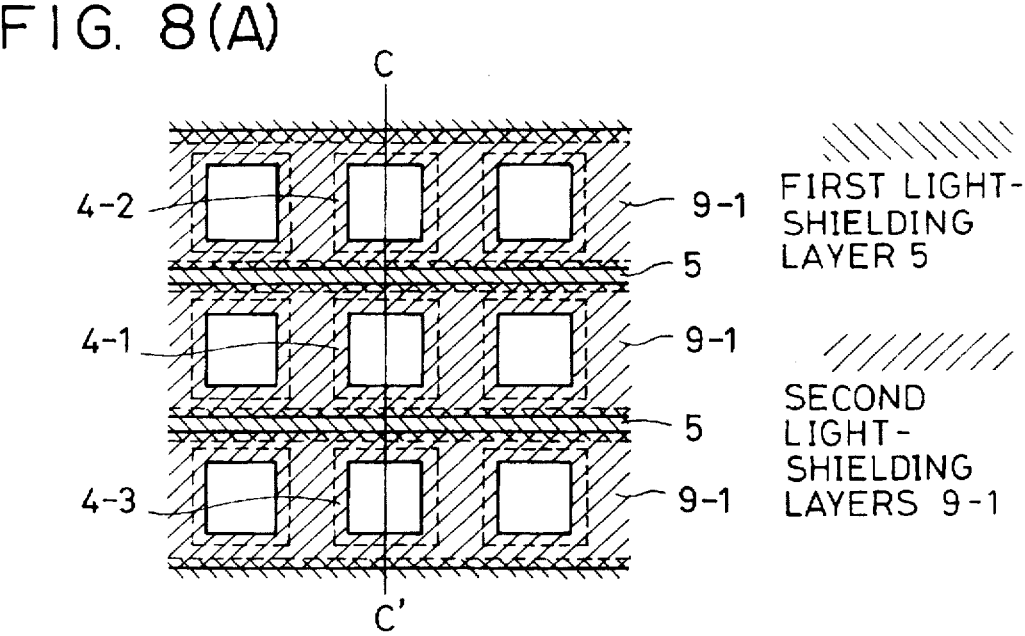
FIG. 8(A)
FIRST LIGHT-SHIELDING LAYER 5
SECOND LIGHT-SHIELDING LAYERS 9-1
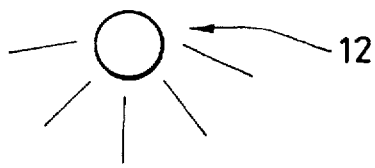
FIG. 8(B)
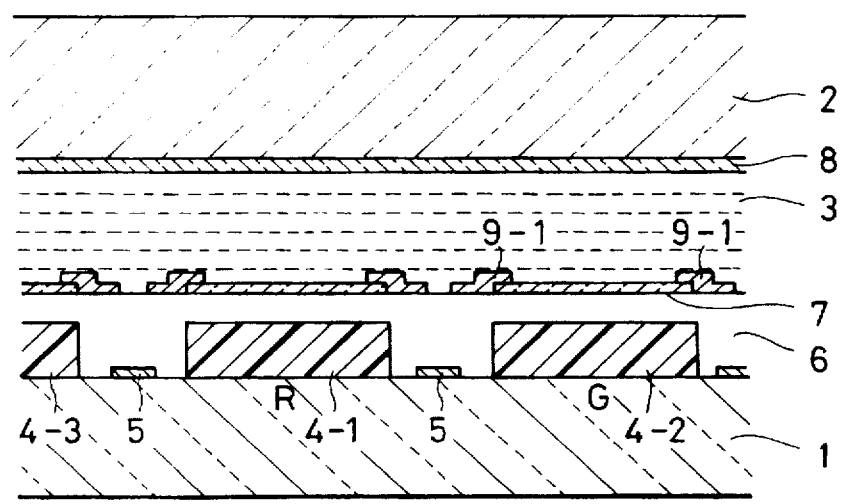

FIRST LIGHT-SHIELDING LAYER 5

SECOND LIGHT-SHIELDING LAYERS 9-1, 9-2

COLOR LIQUID CRYSTAL PANEL WITH LIGHT SHIELDING LAYER SECTIONS FORMED BETWEEN COLOR FILTER FILMS WITHOUT CONTACTING SAID COLOR FILTER FILMS

BACKGROUND OF THE INVENTION

1. Field of the Invention

The present invention relates to a color liquid crystal panel comprising color filter films and light-shielding patterns.

2. Description of the Related Art

In recent years, a color liquid crystal panel has been drawing attention as a flat panel display which can be used in place of a cathode ray tube (CRT). The color liquid crystal panel comprises on a base: (1) a color filter substrate having a red (R), green (G), and blue (B) color filter portions, (2) electrodes formed as light switches in correspondence with each of the color portions, and (3) a liquid crystal.

To improve the performance of the color display of such a liquid crystal panel, various techniques have been previously developed, particularly those which try to achieve this goal by offering different structures for regions around the aforementioned color filters.

For example, Japanese Patent Publication No. 2-1311 discloses a technique employed to improve the image quality of the color display. In the disclosure, the liquid crystal display device comprises color filters, with light-shielding patterns, which are optically black metallic films formed between color filter films in contact with the color filter films. These light-shielding patterns shield the light trying to pass between the color filter films in order to prevent color mixture and to improve the display quality such as the contrast. The cross sectional structure of the aforementioned liquid crystal display device will be described in detail, with reference to FIGS. 1A and 1B. FIG. 1A is a plan view of the color filter portions of the device, while FIG. 1B is an overall cross sectional view taken along line C–C' of FIG. 1A.

The liquid crystal display device illustrated in FIGS. 1A and 1B has a liquid crystal 103 formed between a substrate 101 and a substrate 102. The substrate 101 has formed thereon a plurality of color filter films 104 for various colors (R: 104-1, G: 104-2, B: 104-3). A black metal film 105 as a light-shielding layer section (pattern) is formed between and in contact with each color filter film. Stripe transparent electrodes 107 are formed above the color filter films and the light-shielding layer sections in correspondence with each color filter film via a transparent film 106. The stripe transparent electrodes 107 are also formed perpendicular to transparent electrodes 108 on the substrate 102 opposite the substrate 101. Reference numerals 111 denotes the observer, while reference numeral 112 denotes a backlight light source.

In the color filters of the device having such a structure, color mixing is prevented which is achieved by shielding light trying to pass between the color filter films.

However, such a device employing Cr or other thin metal film for the light-shielding layer section (pattern) has the following problem. Although the metal film is highly adhesive to the substrate and has excellent light shielding performance, it acts as a mirror at the surface which reflects light strongly, resulting in a display problem. For example, when the color filter is at the observer side, the light source or observer reflected on the screen may make it difficult to read what is displayed on the screen.

In view of such a problem, there has been a demand for a color filter with a light-shielding layer pattern of low reflectivity.

To respond to such a demand, for example, Japanese Patent Laid-Open No. 2-144525 discloses a liquid crystal display device having several light-shielding layer sections (patterns), or more specifically three-laminated light-shielding layer sections comprising a metal oxide film, a metal film, and a metal oxide film. A light-shielding layer section (pattern) made of materials with low reflectivity such as black resin has also been proposed.

Such light-shielding layer sections, though less reflective, do not adhere onto the substrate as well as do metal film light-shielding layer sections because they are made of metal oxides. In addition, they have less light-shielding performance. Therefore, overall, the light-shielding layers made of metal oxides are not as effective in shielding light compared to the light-shielding layer section made of metal film. In addition, the manufacturing processes of the aforementioned multi-layered light-shielding structure are very complicated, which has resulted in reduced yield and higher costs.

SUMMARY OF THE INVENTION

Accordingly, an object of the present invention is to provide a color liquid crystal panel comprising color filter films, which is highly effective in shielding light trying to pass between color filter layers, satisfactorily prevents color mixture causes by shielding light trying to pass between the color filter layers, has light-shielding layer sections whose surfaces are less reflective to external light, etc., in order to provide an excellent color display quality.

This object is achieved by a color liquid crystal panel which has a liquid crystal placed between a first substrate and a second substrate, the first substrate having formed thereon a plurality of color filter films and transparent electrodes in correspondence with display pixels and the second substrate having formed thereto a transparent electrode, wherein first light-shielding layer sections are formed on the first substrate in the same layer as the color filter films or in a layer at the substrate side from the color filter films, without contacting the color filter films, and wherein second light-shielding layer sections are formed in a layer at the liquid crystal layer side from the color filter films, so that light trying to pass between color filter films is completely shielded by the first light-shielding layer sections and/or the second light-shielding layer sections.

BRIEF DESCRIPTION OF THE DRAWINGS

FIG. 1A is a plan view of a construction of an ordinary color liquid crystal panel (liquid crystal display device); and FIG. 1B is a cross sectional view taken along line C–C' of FIG. 1A.

FIG. 8A is a plan view of a construction of a color liquid crystal panel of a fourth embodiment of the present invention; and FIG. 8B is a cross sectional view taken along line C–C' of FIG. 8A.

DESCRIPTION OF THE PREFERRED EMBODIMENTS

Figure 2:
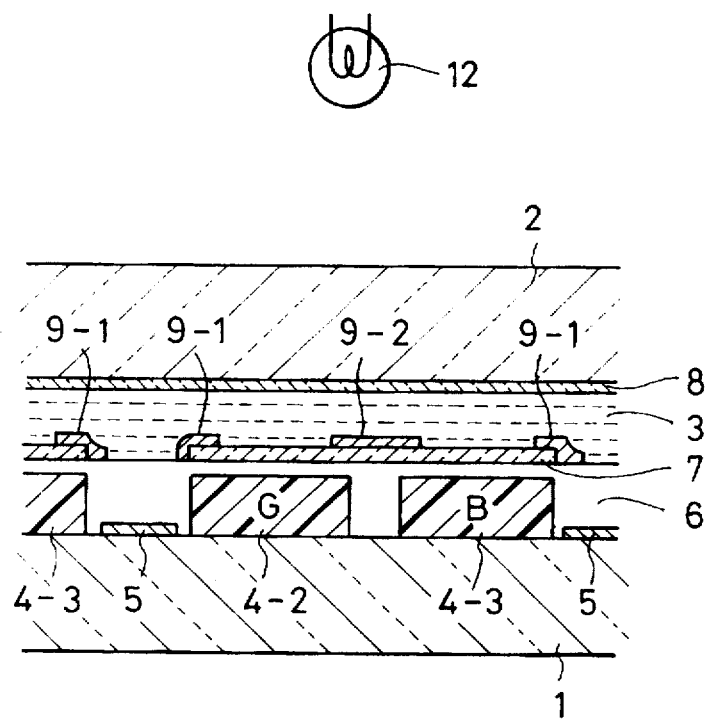
FIG. 2 is a cross sectional view of a construction of a color liquid crystal panel of a first embodiment of the present invention.

In the color liquid crystal panel of the present invention, the first substrate having formed thereon color filer films can preferably be disposed at the panel display surface side, that is at the observer side.

According to the color liquid crystal panel of the present invention, light trying to pass between the color filter films is shielded either by first light-shielding layer sections or second light-shielding layer sections, or by a combination thereof, these layer section types being formed in different layers. Accordingly, it is possible to improve the light-shielding performance, reduce reflectivity, and achieve better adhesion of the light-shielding layer sections to the substrate and to other layers, by appropriate selection of the materials, areas, light-shielding ratios, etc., for the first and the second light-shielding layer sections.

For example, metallic materials are used to form the first light-shielding layer sections to a width smaller than the distance separating the color filter films, without the sections touching the color filter films, so that the first and the second light-shielding layer sections together completely shield light trying to pass between the color filter films. In this case, even if the first light-shielding layer sections, capable of being disposed toward the display surface, are metallic films, the reflectivity is not high because they occupy a smaller area than light-shielding layer sections which contact the color filter films as shown in FIG. 1(B). In addition, although less light is shielded by the first light-shielding layer sections because of its smaller area, the light which is trying to pass between the color filter films are shielded by the second light-shielding layer sections disposed in the liquid crystal side, so that, overall, these two types of light-shielding layer sections with low reflectivity and capable of satisfactory light shielding shields any light trying to pass between the color filter films.

Though the present invention is not limited to the above-described construction, the color display panel sufficiently shields light trying to pass between the color layers to reduce color mixture, does not reflect light too strongly, and provides excellent color display quality, which are achieved by the two types of light-shielding layer sections which are formed in different layers and are appropriately designed.

Examples of the materials used for the aforementioned first and the second light-shielding layer sections of the liquid crystal panel of the present invention include metals such as Cr and Mo, or oxides thereof; nonmetallic materials; black resin, that is resin having a black pigment or the like dispersed therein; and organic materials, photosensitive resin being a leading example. Optically black-colored materials are preferably selected and used. It is preferable that resinous materials have a plurality of pigments dispersed therein to improve the light-shielding performance.

The color filter film is one which exhibits spectral transmittance for red (R), green (G), or blue (B), with a transparent film designed when necessary.

A description will now be given of specific embodiments of the present invention, with reference to the drawings.

FIG. 2 illustrates a cross sectional construction of a color liquid crystal panel of a first embodiment of the present invention.

Referring to the figure, reference numeral 11 denotes an observer, and reference numeral 12 denotes a backlight light source. A substrate 1 having formed thereon color filter films 4 (namely, red color filter R denoted by 4-1, green color filter G denoted by 4-2, blue color filter B denoted by 4-3, and white (transparent) color filter W denoted by 4-4) at the side of the observer 11, and another substrate 2 at the side of the light source 12, with a liquid crystal 3 placed between these two substrates. The white color filter W: 4-4 forms an intermediate color produced by combination of R, G, and B, and may be provided when necessary for the purpose of increasing the luminance of R, G, and B. In the regions corresponding to these color filter films 4-1 to 4-4, on/off operation is controlled for color display. In the aforementioned construction, the area corresponding to the four color filter films R, B, G, and W form a pixel which is a single unit. First light-shielding layer patterns 5 and a passivation film 6 are coated onto the substrate 1. The first light-shielding layer sections, made of, for example, Cr, are formed on the same surface as the color filter films 4, without touching the color filter films. The passivation film 6 protects the color filter films and fills the space formed by differences in level produced between the filters to form a level surface. Long and thin transparent electrodes 7 at the scanning side are formed on the passivation film 6. Second light-shielding layer patterns 9-1, 9-2 are formed on the transparent electrode 7 in accordance with the interval formed between the lower color filter films 4. A long, stripe transparent electrode 8 is formed onto the other substrate 2 perpendicular to the transparent electrode 7. In order to improve various characteristics (such as short-circuit control between the substrates or liquid crystal orientation) in a liquid crystal device, an insulation layer, a liquid crystal orientation control layer, or the like, made of organic materials or inorganic materials, may be formed on the transparent electrodes 7 and 8. (The insulation layer and the liquid crystal orientation control layer are not shown in Figures.)

Figure 3A:
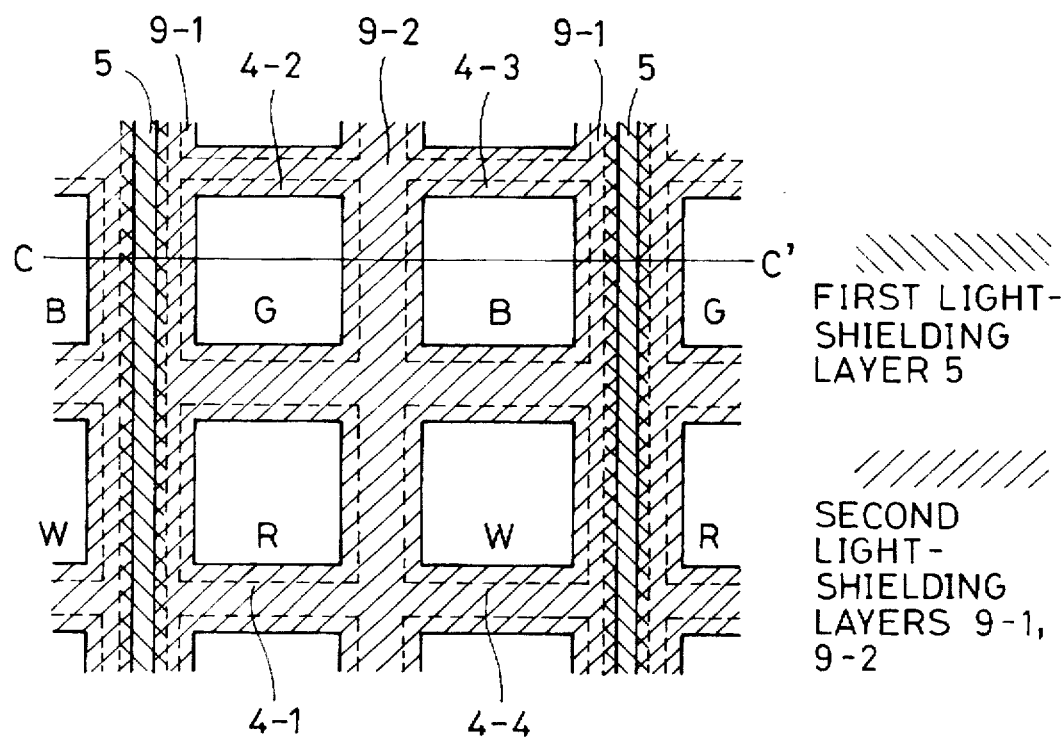
FIG. 3A is a plan view of a construction of a substrate of the color liquid crystal panel of the first embodiment of the present invention.
Figure 3B:
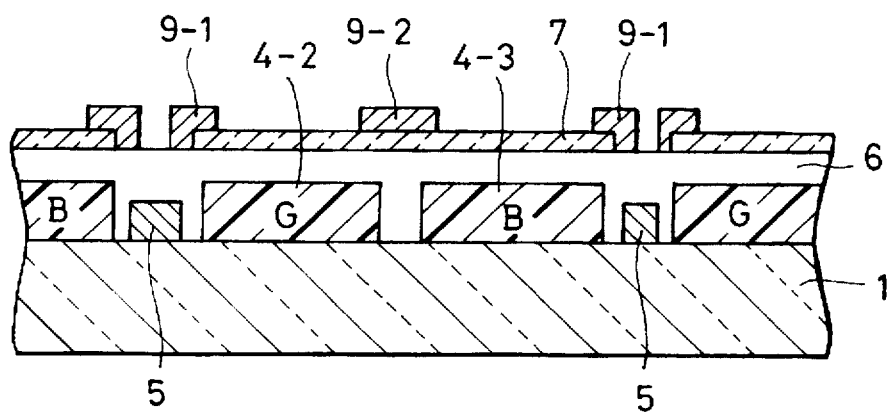
FIG. 3B is a cross sectional view taken along line C–C' of FIG. 3A.

FIG. 3A is a plan view of the construction of color filters adjacent to the substrate 1 of the liquid crystal panel with the above-described construction, as seen from the liquid crystal side, while FIG. 3B is a cross sectional view of the construction, and is taken along line C–C' of FIG. 3A.

In a cross section of the liquid crystal panel having such a construction, the first light-shielding layer section 5 with a width smaller than the distance separating the color filter films, and the second light-shielding layer section 9-1 formed above the first light-shielding layer section 5 (liquid crystal side) together completely intercept the light trying to pass between the color filter films 4-3 (R) and 4-2 (G) respectively belong to the neighboring different pixels. The light trying to pass between the color filter films 4-2 (G) and 4-3 (B) in the same pixel is completely shielded by the second light-shielding layer section 9-2 alone.

Therefore, when metallic films are formed as the first light-shielding layer sections at the display surface side, the first light-shielding layer sections do not contact the color filter films, and are formed between some of the color filter films, so that compared to, for example, the liquid crystal panel having the FIG. 1 construction, the metallic films formed as the light-shielding layer sections occupy less space (area) compared to the display surface, so that excessive reflection does not occur. In addition, the second light-shielding films used singly or along with the first light-shielding films to assist in the shielding completely shield the light trying to pass between the color filter films, so that appropriate selection of the materials and arrangement of both types of light-shielding layer sections makes it possible to realize low reflectivity and satisfactory light shielding.

In the above-described construction, the metallic films formed as the second light-shielding layer sections 9-1, 9-2 can be used as auxiliary wiring electrodes on the transparent electrode 7, making it possible to prevent reduced image quality caused by voltage applied during driving a large-area panel. It is to be noted that as shown in FIG. 3A, excluding the areas corresponding to the color filter films 4-1 to 4-4, the second light-shielding layer sections are formed like window frames around the transparent electrode 7. More specifically, the light passing through the color filter films 4-1 to 4-4 is shielded by frame-like light-shielding layer sections, so as to form the different color areas (dots) with actually effective optical modulation. Although the R, G, and B color regions may have different shapes, it is preferable that they have the same area. However, it is preferable that the white (W) color region has a smaller area than the other regions, taking into account its visibility with respect to the human eye. To reduce the reflectivity, it is preferable that the first light-shielding layer sections are made of metal oxide or a nonmetallic material.

In addition, in the above-described construction, formation of the first light-shielding layer sections onto the substrate, without touching the color filter films solves the conventional problem of partial peeling of the color filter films and production of residues, resulting from a difference in adhesion at the interface of the color filter film and the light-shielding layer section, and that at the interface between the color filter film and the substrate. In particular, using a metallic film for the first light-shielding layer section and resinous materials for the base of the color film layer results in increased adhesion of the light-shielding layer section and the color filter films, improved characteristics of the light-shielding layer section, and very infrequent occurrence of color film layer defects, since the color filter film and the first light-shielding film do not contact each other.

Figure 4:
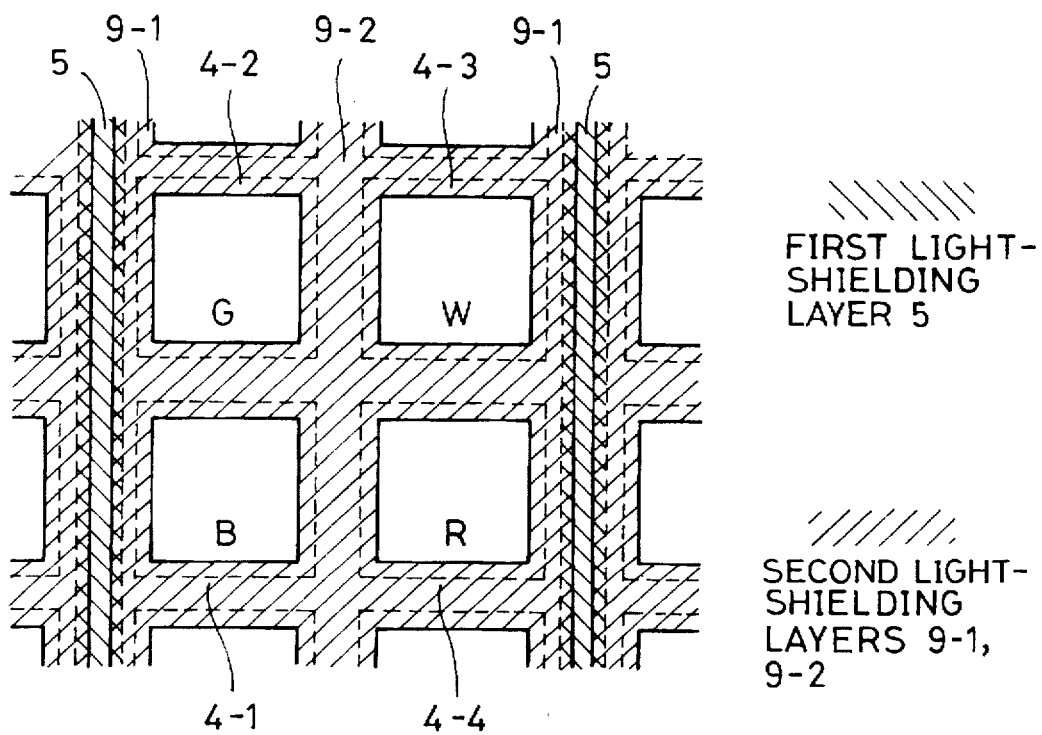
FIG. 4 is a plan view of a modification of the substrate of he color filter of the first embodiment of the present invention.

Although in the above-described construction, the arrangement of the color filter films 4-1 to 4-4 is not particularly limited, it may take the form shown in, for example, FIG. 4.

Experimental Example 1

A description will now be given of an experimental example of a first embodiment construction liquid crystal panel.

In conformity with the arrangement of the embodiment, a liquid crystal panel was prepared in the following way. Sputtering and photolithography patterning was performed to form Cr films with a thickness of 1000 Å as first light-shielding films on the washed and dried glass substrate, followed by formation of 1.5 μm thick color filter films (R, B, and G films) by photolithography patterning, and a passivation film (DA-100C, manufactured by Ube Industries Ltd., film thickness: 1.5 μm) by coating. Then, ITO film strips with a thickness of 1.5 μm were formed as transparent electrodes, after which Al films with a thickness of 1000 Å was formed as second light-shielding layer sections by sputtering and photolithography patterning. Thereafter, in the same way a substrate was placed opposite the substrate having formed thereon ITO transparent electrodes to allow injection of a liquid crystal between the substrates, after which a backlight light source was provided.

The liquid crystal panel of the FIG. 1 construction was prepared by forming 1.5 μm thick color filter films (R, G, and B films), 1000 Å thick Cr films as light-shielding layer sections, a 1.5 μm thick passivation film (DA-1000C, manufactured by Ube Industries Ltd.), and 1500 Å thick ITO films as transparent electrodes, after which a backlight light source was provided.

Figure 5:
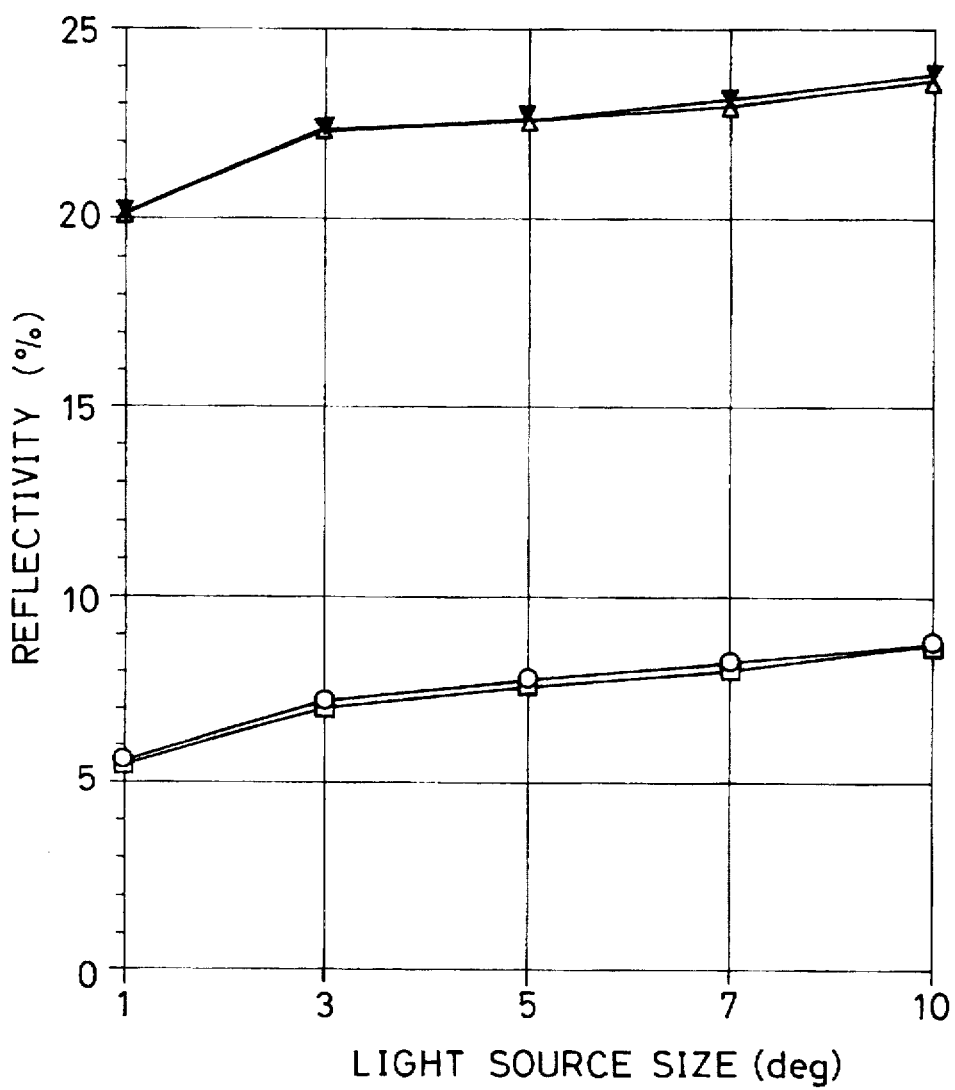
FIG. 5 is a graph showing the relationship between the light source size and the reflectivity of the display surface of the liquid crystal panel of the first embodiment of the present invention and that of the color liquid crystal panel as shown in FIG. 1.

Evaluations were made of the reflectivities of these liquid crystal panel at the surface (at the side of the observer) with changes in the light source size are shown in FIG. 5.

More specifically, the luminance from reflection on the mirror surface of the liquid crystal panel was measured by positioning a light source 50 cm from a measurement point on the display surface of the liquid crystal panel so that the angle of incidence was 10° with respect to the measurement point, and positioning an apparatus for measuring luminance (BM-7, manufactured by Topcon) 50 cm from the measurement point in order to allow measurement of light having an angle of reflection of 10° with respect to the measurement point, with changes made in the size of the light source. The luminance of a similar light source was measured by positioning it 100 cm opposite an apparatus for measuring the luminance. From the thus-obtained two values, the surface reflectivity of the liquid crystal panel was calculated using the following formula: reflectivity of the mirror surface (%)=(luminance from reflection on the mirror surface/ luminance of light source)×100. It is to be noted that five different sizes were selected for the light source with respect to the viewing angle at a location 50 cm as viewed from the measurement point of the liquid crystal panel: 1°, 3°, 5°, 7°, and 10°. In adjusting the size of the light source, apertures of various shapes were placed right in front of a uniform ball-type white fluorescent light having a luminance of about 11,000 cd/cm². The measurement angle with respect to the object whose luminance was to be measured by the apparatus was 0.2° in the case where the sizes of the light source were 1°,3° and 5° with respect to the viewing angle, and 2° in the case where the sizes were 7° and 10° with respect to the viewing angle. The measurement results are shown in FIG. 5.

The results showed that the reflectivity of the panel of the present invention construction at the surface is reduced by about ¼th the FIG. 1 panel. This means that reflectivity at the surface is not excessive in the liquid crystal panel of the present invention construction.

Figure 6A:
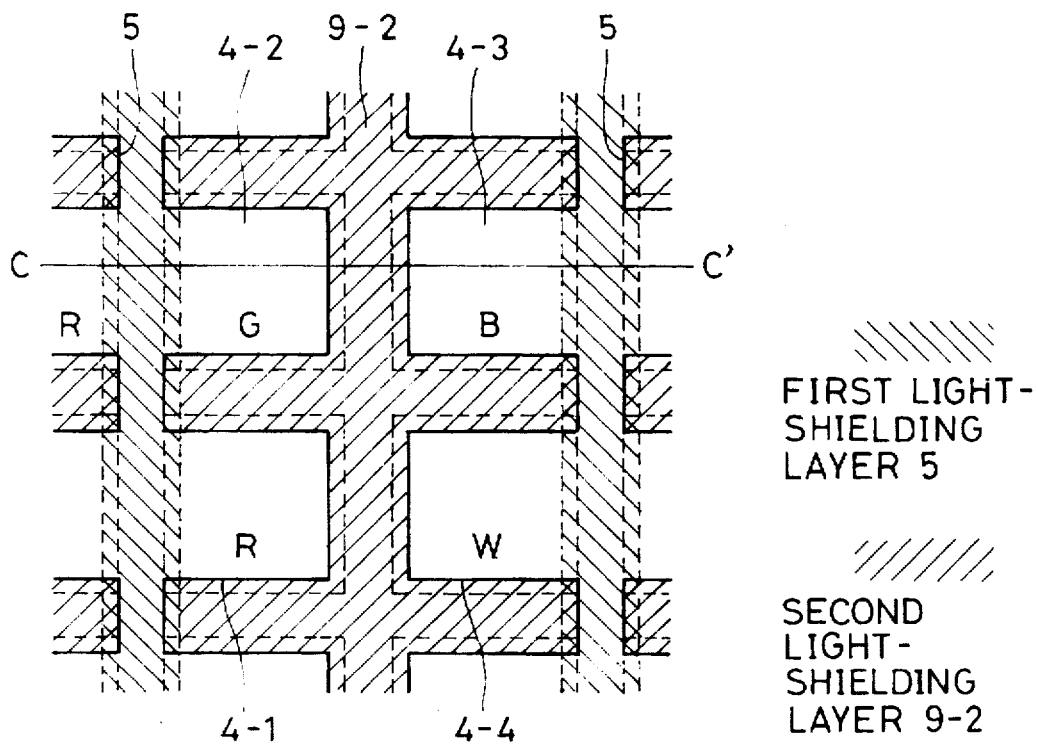
FIG. 6A is a plan view of a construction of a color filter substrate of a color liquid crystal panel of a second embodiment of the present invention.
Figure 6B:
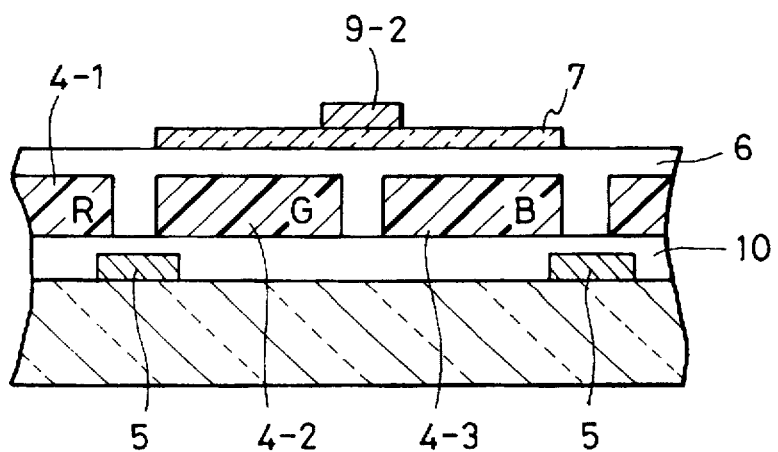
FIG. 6B is a cross sectional view taken along line C–C' of FIG. 6A.

FIG. 6A illustrates a plan view construction of a substrate having formed thereon color filters in a liquid crystal panel of a second embodiment of the present invention, while FIG. 6B illustrates a cross sectional construction taken along line C–C' of FIG. 6A. In these figures, the same reference numerals denote the same members of FIGS. 2 and 3 (first embodiment).

In the FIG. 6 construction, the first light-shielding layer patterns 5 are disposed in correspondence with the gaps formed between the color filter films on the substrate 1. After forming an overcoat film 10 on the substrate, color filter films 4 (R: 4-1, G: 4-2, B: 4-3, and W: 4-4) and the passivation layer 6 are formed in the same way as in the first embodiment. The passivation layer 6 has formed thereon the transparent electrode 7 which has formed thereon the light-shielding layer pattern 9-2 in correspondence with a gap between the color filter films not shielded by first light-shielding layer section 5.

In a cross section of the liquid crystal panel with such a construction, light trying to pass between, for example, the color filter films 4-1 (R) and 4-2 (G) is completely shielded only by the first light-shielding layer section 5 formed below the color filter films in the overcoat film 10. The light trying to pass between the color filter films 4-2 (G) and 4-3 (B) is virtually completely shielded by the second light-shielding layer section 9-2. More specifically, the different color areas in correspondence with the color filters 4-1 to 4-4 are defined by the first light-shielding layer sections and the second shielding layer sections.

Even when metallic films are used as first light-shielding layer sections at the side of the display surface, reflection at the display surface is reduced due to the smaller area of the metallic films because not all of the gaps between the color filter films are shielded by the first light-shielding layer sections. The gap between the color filter films which is not shielded by the first light-shielding layer section is completely shielded by the second light-shielding layer section alone, so that appropriate selection of the position and material of the light-shielding layer sections and the area ratio of the first and the second light-shielding layer sections results in low reflectivity and satisfactory light shielding.

In particular, in the embodiment, the second light-shielding layer section 9-2 may be such as to branch out toward, for example, the color filter films G (4-2)–B (4-3). More specifically, the layer 9-2 may be such as to branch out in the direction of the line C–C' in order to shield the corresponding gap between the color filter films. In this case, the level difference in the liquid crystal quality is reduced.

As in the above-described construction in the first embodiment, the first light-shielding layer sections only contact the substrate surface and do not contact the color filter films which are a part of a different layer, so that color filter film peeling and production of residues occur less frequently compared to the construction as shown in FIG. 1, which is also true for the first embodiment construction. In particular, when a metallic film is used for the first light-shielding layer section and resinous material is used for the base of the color filter films, the adhesiveness of each of the light-shielding layer sections and the color filter films are increased, the characteristics of the light-shielding layer sections are improved, and color filter film defects occur rarely, because the first light-shielding layer section and the base do not contact each other.

Even in this construction, the arrangement of the color filter films 4-1 to 4-4 is not particularly limited to the above-described arrangement.

(Experimental Example 2)

A description will now be given of an experimental example of the liquid crystal panel of the above-described embodiment construction.

In conformity with the embodiment construction, a liquid crystal panel was prepared in the following way. On a glass substrate, there were formed 1000 Å thick Cr films as first light-shielding layer sections, a 2000 Å thick $SiO_2$ film as an overcoat film by sputtering, and other films and layers as in Embodiment 1, namely, 1.5 μm thick color filter films (R, G, and B films), a 1.5 μm thick passivation film, 1500 Å thick ITO films as transparent electrodes, and 1000 Å thick Al films as the second light-shielding layer section. Further, in the same way a substrate was placed opposite the substrate having formed thereon ITO transparent electrodes to allow injection of a liquid crystal between the substrates, after which a backlight light source was provided.

It is to be noted that in the above-described process, the first light-shielding layer section and the second light-shielding layer sections were formed under difference conditions, so that five different types of liquid crystal panels in which the first light-shielding layer sections and the second light-shielding layer sections have different area percentages were formed.

The five different types of liquid crystal panels whose first and second light-shielding layer sections have different area percentages in the second embodiment construction were evaluated for display surface reflectivity as in Embodiment 1. The results are shown in the following table.

TABLE 1

| First light-shielding layer section area (%) percentage | 100 | 80 | 50 | 30 | 10 |
|---|---|---|---|---|---|
| Second light-shielding layer section area (%) percentage | 0 | 20 | 50 | 70 | 90 |
| Panel surface reflectivity (%) | 20 | 19 | 10 | 8 | 5 |

The results in the table above showed that the liquid crystal panel of the second embodiment construction is less reflective at the surface due to a smaller area ratio of the first light-shielding layer section formed below the color filter films at the display side. For example, when the first light-shielding layer section to the second light-shielding layer section has an area ratio of 1:1 (each light-shielding layer section has an area percentage of 50), too much reflection is not observed at the surface.

Actually, it is preferable to optimally set the area ratio of the first and the second light-shielding layer sections, taking into account light shielding, and in particular the balance between the color mixture condition between adjacent color layers and the reflectivity.

Figure 7:
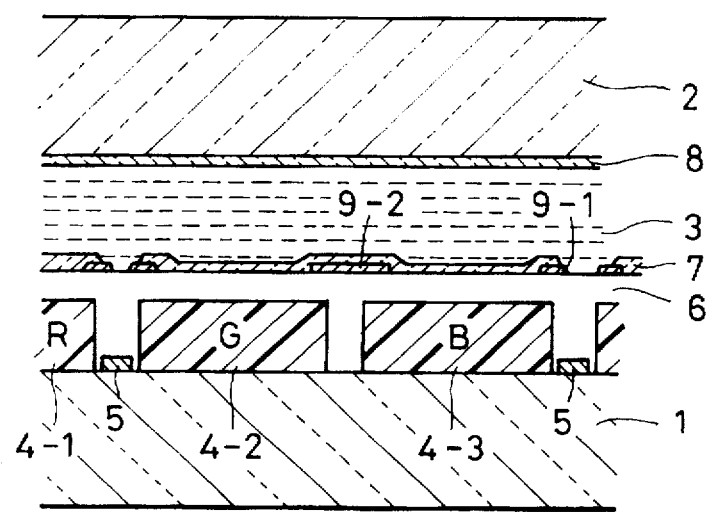
FIG. 7 is a cross sectional view of a construction of a color liquid crystal panel of a third embodiment of the present invention.

FIG. 7 is a cross sectional view of the construction of such a color liquid crystal panel of the third embodiment. Referring to the same figure, the same reference numerals as those of FIGS. 2 and 3 (first embodiment) denote the same members.

The panel of the figure is essentially constructed in the same way as Embodiment 1, except that as regards the arrangement of the color filter films 4 (R: 4-1, G: 4-2, B: 4-3, and W: 4-4 (not shown)), the first light-shielding layer sections 5, the second light-shielding layer sections 9-1, 9-2, and other members, the second light-shielding layer sections 9 are disposed such that they are covered with the transparent electrodes 7.

More specifically, in a cross section of the liquid crystal panel with such a construction, the gap, for example, between the color filter films 4-1 (R) and 4-2 (G) is entirely shielded by the first light-shielding layer section 5 with a width smaller than the distance separating the color filter films and the second light-shielding layer section 9-1 disposed in a layer above the layer of the first light-shielding layer section 5. The gap between the color filter films 4-2 (G) and 4-3 (B) is shielded completely by the second light-shielding layer section 9-2 alone.

Therefore, in the liquid crystal panel having the embodiment construction, excessive reflection does not occur at the display surface due to the same reason as in the aforementioned first embodiment. In addition, since the gaps between the color filter films are completely shielded either by a combination of the first light-shielding film with a second light-shielding film which assists in the light shielding of the first light-shielding layer section, or by the second light-shielding layer section alone, appropriate selection of the material and arrangement for the light-shielding layer section allows low reflectivity as well as satisfactory light shield to be achieved. Further, partial color filter film peeling and production of residues occur less frequently, the characteristics of the light-shielding layer section is improved, and color filter film defects occur rarely.

Even in this construction, the arrangement of the color filter films 4-1 to 4-4 is not particularly limited to the above-described arrangement.

(Experimental Example 3)

A description will now be given of an experimental example of the liquid crystal panel with the embodiment construction.

In conformity with the construction of the embodiment, a liquid crystal panel was prepared as in Embodiment 1. On a glass substrate, there were formed 1000 Å thick Cr films as first light-shielding layer sections, followed by formation of 1.5 μm thick color filter films, a 1.5 μm thick passivation film, 1500 Å thick ITO films as transparent electrodes, and 1000 Å thick Cr films as second light-shielding layer sections. Thereafter, in the same way a substrate was placed opposite the substrate having formed thereon ITO transparent electrodes to allow injection of a liquid crystal between the substrates, after which a backlight light source was provided.

The liquid crystal panel with the FIG. 1 construction was prepared in the same way as in the foregoing description.

The reflectivity of each liquid crystal panel at the surface at the display side (observer) was evaluated. The evaluation showed that the reflectivity of each liquid crystal panel according to the present invention is reduced by about ¼th that of the panel of the construction as shown in FIG. 1, which proves that excessive reflection does not occur at the surface of each liquid crystal panel of the present invention construction.

FIG. 8 is a cross sectional view of the construction of such a liquid crystal panel of a fourth embodiment. FIG. 8A is a plan view of the color filter portion of the device, as seen from the liquid crystal side, whereas FIG. 8B is an overall cross sectional view along line C–C' of FIG. 8A. In these figures, the same reference numerals as those of FIGS. 2 and 3 denote the same structural members.

In the liquid crystal panel with such a construction, the row of the color filter films 4-1, 4-2, and 4-3, and the row of the transparent electrode patterns 7, that is the row of transparent electrode pattern 7 and the row of the color filter film 4-1 correspond with each other, so that in a cross section, each of the gaps between the color filter films in correspondence with the locations of the transparent electrodes are completely shielded by both the first light-shielding layer sections and the second light-shielding layer sections.

In detail, in a cross section along a direction perpendicular to the transparent electrode patterns, that is along a direction perpendicular to line C–C' of FIG. 8A, the gap between the color filter films 4-1 (R) and 4-2 (G), as well as the gap between the color filter films 4-2 (G) and 4-3 (B) are, overall, completely shielded by the first light-shielding layer sections 5 with a width smaller than the distance between the color filter films and the second light-shielding layer section 9-1 formed in a layer above the layer of the first light-shielding layer sections 5. Therefore, in the liquid crystal panel of the embodiment construction, excessive reflection does not occur at the surface due to the same reason as in the first embodiment. In addition, since the gaps between the color filter films are completely shielded by either a combination of the first light-shielding film with the second light-shielding films which assist in the light shielding of the first light-shielding layer section, appropriate selection of the material and arrangement for the light-shielding layer section allows low reflectivity as well as satisfactory light shielding to be achieved. Further, partial color filter film peeling and production of residues occur less frequently, the characteristics of the light-shielding layer section is improved, and color filter film defects occur rarely.

In the panel of the embodiment, to reduce reflection at the surface, it is preferable that an oxide or a nonmetallic material be used for the first light-shielding layer section near the display side, and metallic material is used for the second light-shielding layer sections near the color filter films from the liquid crystal side, as in the first embodiment. In this case, the second light-shielding layer sections 9-1, 9-2 can function as auxiliary wiring electrodes on the transparent electrode 7, making it possible to prevent reduced image quality caused by voltage applied during driving at a large-area panel. Further, in this case, the second light-shielding layer sections are made larger than the first light-shielding layer sections in area to reduce reflection at the display surface. The first light-shielding layer sections on the substrate, that is the area of contact of nonmetallic materials, are made smaller, for the purpose of preventing reduced adhesion as compared to the first light-shielding layer sections made of metals.

A description will now be given of an experimental example of the liquid crystal panel of the embodiment construction.

(Experimental Example 4-1)

In accordance with the construction of the embodiment, a liquid crystal panel was prepared. Sputtering and photolithography patterning were carried out to form 1000 Å thick $Cr_2O_3$ films as first light-shielding layer sections, followed by formation of 1.5 μm thick color filter films for R, G, and B by photolithography patterning, a 1.5 μm thick passivation film by coating, 800 Å thick ITO film strips as transparent electrodes, and 1500 Å thick Al films as second light-shielding layer sections on the transparent electrodes by sputtering and photolithography patterning. Thereafter, in the same way a substrate was placed opposite the substrate having formed thereon ITO transparent electrodes to allow injection of a liquid crystal between the substrates, after which a backlight light source was provided.

It is to be noted that the first light-shielding layer section is smaller in area than the second light-shielding layer section, the second light-shielding section functioning as an auxiliary wiring electrode on the transparent electrode.

Evaluation of the reflectivity at the display surface (observer side) of such a liquid crystal panel showed a 6% reflectivity and excellent visibility. In addition, light-shielding layer section peeling occurs less frequently because of a smaller $Cr_2O_3$ first light-shielding layer section area.

(Experimental Example 4-2)

A liquid crystal panel was prepared in the same way as in the Experimental Example 4-1, except that black resinous layer or a layer made of resin with a black pigment dispersed therein was formed as a first light-shielding layer section by printing. Evaluation of the display performance was conducted in the same way.

The evaluation showed a 7% reflectivity, with less reflection of the observer, light source, etc. on the surface and excellent visibility. In addition, since first light-shielding layer section with a small area is formed, less material is used up during the printing process.

The liquid crystal panel of the FIG. 1 construction was prepared by sequentially forming 1.5 μm thick color filter films (R, G, and B films), 800 Å thick Cr films as light-shielding layer sections, a 1.5 μm thick passivation film, and 800 Å thick ITO films as transparent electrodes, followed by provision of a backlight light source.

Evaluation of the display performance of such a liquid crystal panel was conducted as in the Experimental Example 4-1.

The evaluation showed a 25% reflectivity, with a relatively clear reflection of the observer, light source, etc. on the panel display surface, so that it is a little difficult to see the display.

Figure 9A:
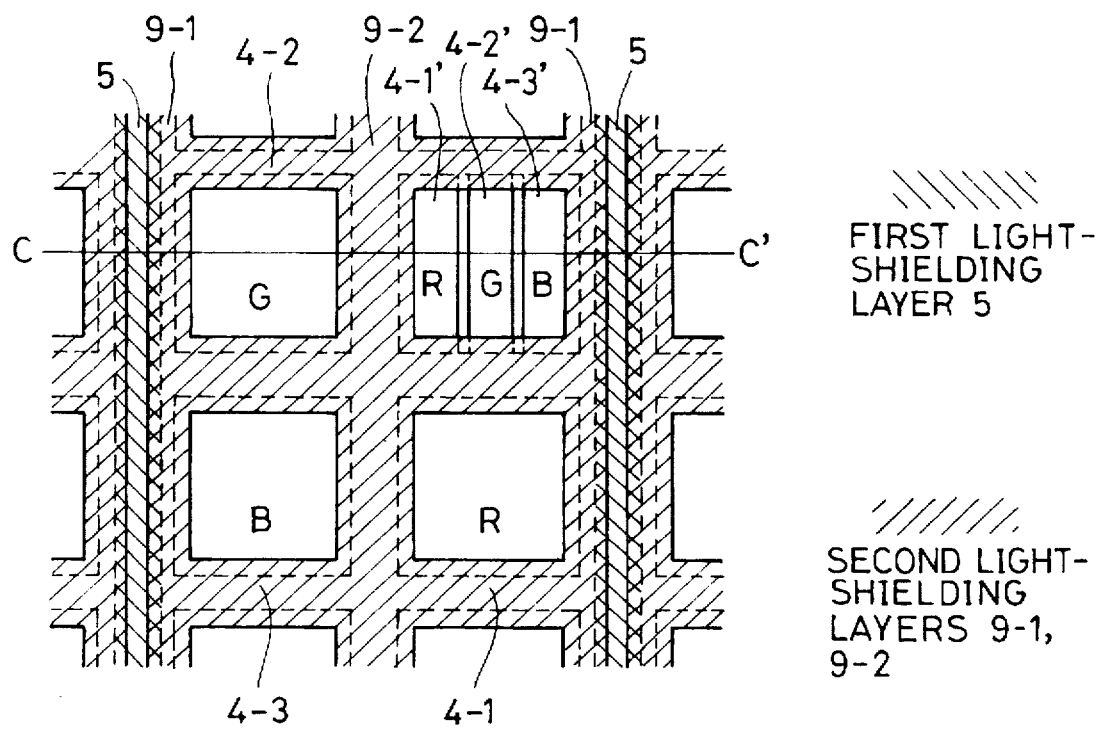
FIG. 9A is a plan view of a construction of a color liquid crystal panel of a fifth embodiment of the present invention.
Figure 9B:
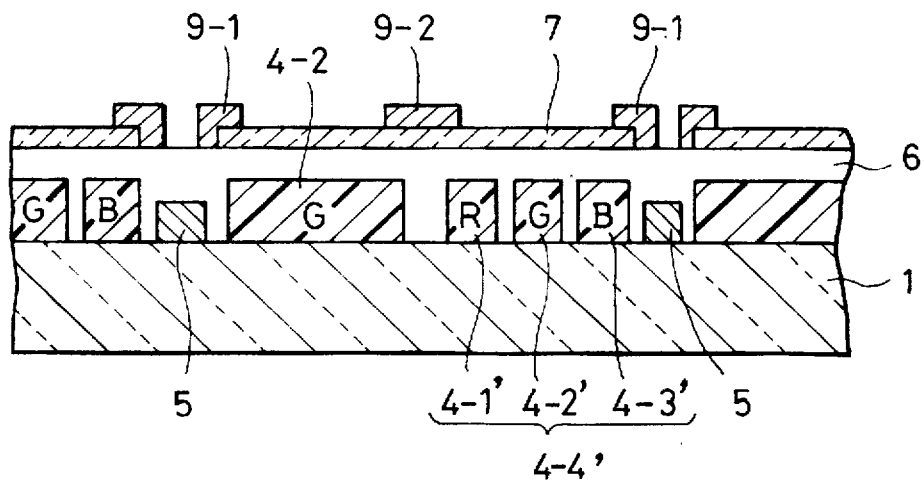
FIG. 9B is a cross sectional view taken along line C–C' of FIG. 9A.

FIG. 9A is a plan view of the construction of the substrate at the color filter side of such a liquid crystal panel of a fifth embodiment of the present invention, while FIG. 9B is a cross sectional view taken along line C–C' of FIG. 9A. The same reference numerals as those of FIGS. 2 and 3 (the first embodiment) denote the same structural members.

The construction of such an embodiment is primarily the same as that of the first embodiment illustrated in FIGS. 2 and 3, except that instead of the white (transparent) color filter, there is formed a white (transparent) color area 4-4" comprising color filter films 4-1', 4-2', and 4-3' arranged in a row, with the filter films having the same colors as the color filter films 4-1, 4-2, and 4-3 and having a smaller area. The electrode and the wiring structure allows these color filter films to be turned on or off simultaneously, which causes a white display.

In the embodiment, the overall color filter film formation process is simplified because it is possible to perform pattern formation of the fine filter films 4-1', 4-2', and 4-3' simultaneously with the red color filter film 4-1, green color filter film 4-2, and the blue color filter film 4-3, instead of performing patterning by photolithography, etc., in order to form the white color filter film (W) 4-4, as illustrated in FIG. 2. In the white color filter film (W) 4-4 in the aforementioned embodiment a difference in the thickness of each dot, which may occur, after patterning, tends to result in insufficient uniformity in the thicknesses of the white filter film and the other color filter films 4-1 to 4-3. However, in the embodiment, pattern formation of the fine filter films 4-1', 4-2', and 4-3' comprising the white area is performed simultaneously with the other color filter films 4-1 to 4-3, so that differences in the thicknesses of the film filters are reduced. Accordingly, in the panel of the embodiment, the surfaces of the color filter films formed on the substrate at the color filter side as well as the surface in contact with the liquid crystal after the formation of various layers become more level, and the orientation state of the liquid crystal being used becomes more uniform.

The arrangement of the fine filter films 4-1', 4-2', and 4-3' of the white color area 4-4' is not particularly limited. For example, the orientation of the stripes of each of the filter films R 4-1', G 4-2', and B 4-3' can be arbitrarily set. The three types of the fine filter films 4-1', 4-2', and 4-3'may be formed adjacent to one another. It is preferable to space the filter films 4-1', 4-2', and 4-3' by an appropriate gap, in order to control the transmittance of the white color area, and to optimally set the luminance of the pixel and the entire panel.

A description will now be given of a preferable construction of the common structural members of each of the liquid crystal panels of the aforementioned embodiments of the present invention. The color filter films 4-1 (R), 4-2 (G), 4-3 (B), etc. formed on the first substrate 1 are formed by subjecting photosensitive organic polymer film (such as polyamide or polyimide film containing the predetermined coloring components) to photolithography patterning.

Any material can be used for the passivation layer 6 as long as it can be used to fill in the space formed by differences in level of the color filter films in order to form a level surface, and protect the color filter films in the processes which follow, and has thermal resistance and chemical resistance. Examples thereof include polyamide, epoxy resin, and organic silane resin.

As stated above, the second light-shielding layer sections 9-1, 9-2 can be formed as auxiliary electrodes on the transparent electrodes using a predetermined pattern in order to reduce the resistance of the transparent electrodes. The pattern of such second light-shielding layer sections (auxiliary electrodes) defines the area where light is transmitted. Materials for the auxiliary electrodes (secondary light-shielding layer sections) on the transparent electrodes include metal materials such as Cr, Nb, Al, or alloys thereof.

When necessary, an orientation control layer is formed on the transparent electrodes 7 and the second light-shielding layer sections 9-1, 9-2 (auxiliary electrodes) for the purpose of controlling the orientation state of the liquid crystal, the layer being formed via a layer which prevents shorts with the regions at the side of the opposite substrate and enhances the functions of other elements. Useful materials for the orientation control layer are various organic high polymer films such as polyimide or polyamide films and inorganic films. When necessary, materials subjected to uniaxial orientation treatment such as rubbing can be used.

An orientation control layer can also be formed on the second substrate 2 via the transparent electrodes.

The first substrate 1 and second substrate 2 are arranged opposite each other via a predeterminately formed spacer or adhesive material (not shown), with the liquid crystal 3 injected into the space formed between these substrates.

Liquid crystal materials include ferroelectric chiral smectic liquid crystals, as well as twist nematic (TN) and super twist nematic (STN) liquid crystals.

As can be understood from the foregoing description, according to the present invention, the color liquid crystal panel is highly effective in shielding light trying to pass between the color filter films, satisfactorily prevents color mixture between the color filter films, is less reflective to external light or the like at the display surface, and has excellent visibility, so that it provides excellent color display quality. In addition, in such a panel, the light-shielding layer sections and the color filter films have better adhesion, so that film peeling occurs less frequently. Further, such panels having a large area can be uniformly formed with high yield, which allows the panels to have excellent performance.

What is claimed is:

1. A color liquid crystal panel which has a liquid crystal placed between a first substrate and a second substrate, said first substrate having formed thereon a plurality of color filter films and transparent electrodes in correspondence with display pixels and said second substrate having formed thereto a transparent electrode, wherein first light-shielding layer sections are formed on said first substrate in the same layer as said color filter films or in a layer at the first substrate side from said color filter films, without contacting said color filter films, and wherein second light-shielding layer sections are formed in a layer at the liquid crystal layer side from said color filter films, so that light trying to pass between color filter films is completely shielded by said first light-shielding layer sections and/or said second light-shielding layer sections.

2. A color liquid crystal panel according to claim 1, wherein said first light-shielding layer sections are formed in the same layer as the color filter films, and wherein light trying to pass through one gap between said color filter films is completely shielded by both the first light-shielding layer section and the second light-shielding layer section, and light trying to pass through the other gap between the color filter films is shielded by said second light-shielding layer section alone.

3. A color liquid crystal panel according to claim 1, wherein said first light-shielding layer sections are formed at the substrate side in a layer different from the layer of the color filter films, and wherein light trying to pass through one gap between said color filters is shielded by said first light-shielding layer section or said second light-shielding layer section alone.

4. A color liquid crystal panel according to claim 1, wherein the area ratio of said first light-shielding layer section to said second light-shielding layer section is 1 or less.

5. A color liquid crystal panel according to claim 1, wherein light trying to pass through said color filter films arranged in a predetermined row is completely shielded at both sides of the row by said first light-shielding layer sections and said second light-shielding layer sections.

6. A color liquid crystal according to claim 1, wherein said first light-shielding layer section is made of metal.

7. A color liquid crystal panel according to claim 1, wherein said first light-shielding layer section is made of nonmetallic material, and wherein said second light-shielding layer section is made of metallic material.

8. A color liquid crystal panel according to claim 1, wherein said second light-shielding layer section has a larger area than said first light-shielding layer section.

9. A color liquid crystal panel according to claim 1 having at least three types of said color filter film, a red color filter film, a green color filter film, and a blue color filter film.

10. A color liquid crystal panel according to claim 1 having at least four types of said color filter film, a red color filter film, a green color filter film, a blue color filter film, and a white color filter film, the four dots of these color filter films constituting a pixel.

11. A color liquid crystal panel according to claim 1, wherein said color filter film comprises a first red color filter film, a first green color filter film, a first blue color filter film, a second red color filter film with an area smaller than said first red color filter film, a second green color filter film with an area smaller than said green color filter film, and a second blue color filter film with an area smaller than said first blue color filter film, with the areas corresponding to each of said second red color filter film, said second green color filter film, and said second blue filter film being simultaneously turned on to provide a white color display.

12. A color liquid crystal panel which has a liquid crystal placed between a first substrate and a second substrate, said first substrate having formed thereon a red color filter film, a green color filter film, and a blue color filter film, and transparent electrodes in correspondence with display pixels, and said second substrate having formed thereto a transparent electrode, wherein said color filter films are formed in one layer, and said first light-shielding layer sections are formed on said first substrate in the same layer as said color filter films, without contacting said color filter films, and wherein second light-shielding layer sections are formed in a layer at the liquid crystal side from said color filter films, so that light trying to pass between color filter films is completely shielded by said first light-shielding layer section and said second light-shielding layer section, or by said second light-shielding layer section.

* * * * *

UNITED STATES PATENT AND TRADEMARK OFFICE
Certificate

Patent No. 5,757,452                                      Patented: May 26, 1998

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Yuichi Masaki, Kazuya Ishiwata, Masaaki Suzuki, Yuko Yokoyama, Kotara Abukawa and Toshimitsu Tanaka.

Signed and Sealed this Sixth Day of October, 1998.

<div style="text-align:right">

BRIAN W. BROWN
*Special Program Examiner*
Technology Center 2800
Physics, Optics, System Components
and Electrical Engineering </div>

UNITED STATES PATENT AND TRADEMARK OFFICE
CERTIFICATE OF CORRECTION

PATENT NO. : 5,757,452

DATED : May 26, 1998

INVENTOR(S): YUICHI MASAKI ET AL.

It is certified that error appears in the above-identified patent and that said Letters Patent is hereby corrected as shown below:

<u>ON THE COVER PAGE AT [75] INVENTORS</u>

Insert   --Kotaro Abukawa, Atsugi   --; and
         --Toshimitsu Tanaka, Hadono   --.

<u>ON THE COVER PAGE AT [56] FOREIGN PATENT DOCUMENTS</u>

"359172627A  9/1984  Japan ...." should read
   --59-172627  9/1984 Japan--;
"362150221A  7/1987  Japan ...." should read
   --62-150221  7/1987 Japan--;
"2144525  6/1990  Japan ...." should read
   --2-144525  6/1990 Japan--.

<u>ON THE COVER PAGE AT [57] ABSTRACT</u>

"sections." should read --sections--.
In the drawings,

<u>SHEET 8</u>

Figure 8(A), "LAYERS" should read --LAYER--.

<u>COLUMN 1</u>

Line 52, "numerals" should read --numeral--.

UNITED STATES PATENT AND TRADEMARK OFFICE
CERTIFICATE OF CORRECTION

PATENT NO. : 5,757,452

DATED : May 26, 1998

INVENTOR(S): YUICHI MASAKI ET AL.

Page 2 of 4

It is certified that error appears in the above-identified patent and that said Letters Patent is hereby corrected as shown below:

COLUMN 2

Line 27, "causes" should read --cause--;
Line 60, "he" should read --the--.

COLUMN 3

Line 20, "filer" should read --filter--.

COLUMN 4

Line 33, "level" should read --levels--.

COLUMN 6

Line 3, "was" should read --were--.

COLUMN 8

Line 7, "difference" should read --different--;
Line 10, "have" should read --having--;
Line 51, "sections" (first occurrence) should read --section--;
Line 52, "sections" should read --section--.

UNITED STATES PATENT AND TRADEMARK OFFICE
CERTIFICATE OF CORRECTION

PATENT NO. : 5,757,452

DATED : May 26, 1998

INVENTOR(S): YUICHI MASAKI ET AL.

It is certified that error appears in the above-identified patent and that said Letters Patent is hereby corrected as shown below:

COLUMN 9

Line 11, "occur" should read --occurs--;
  Line 41, "invention" should read --inventions--;
  Line 52, "patterns" should read --pattern--;
  Line 67, "sections" should read --section--.

COLUMN 10

Line 3, "sections" should read --section--;
  Line 14, "occur" should read --occurs--;
  Line 66, "that" should read --that a--.

COLUMN 11

Line 6, "since" should read --since a--;
  Line 48, "film" should read --films--.

COLUMN 12

Line 12, "level" should read --levels--;
  Line 27, "electrodes" should read --electrode--.

UNITED STATES PATENT AND TRADEMARK OFFICE
CERTIFICATE OF CORRECTION

PATENT NO. : 5,757,452

DATED : May 26, 1998

INVENTOR(S): YUICHI MASAKI ET AL.

It is certified that error appears in the above-identified patent and that said Letters Patent is hereby corrected as shown below:

<u>COLUMN 14</u>

```
Line 5,  "film," should read --films,--;
Line 8,  "film," should read --films,--;
Line 20, "blue" should read --blue color--;
Line 30, "said" should be deleted--.
```

Signed and Sealed this

Eighteenth Day of May, 1999

Attest:

Q. TODD DICKINSON

*Attesting Officer*  *Acting Commissioner of Patents and Trademarks*